Nov. 25, 1924.
E. D. ANDERSON ET AL
1,516,902
WRAPPING AND LABELING MACHINE
Filed Feb. 27, 1920    11 Sheets-Sheet 5
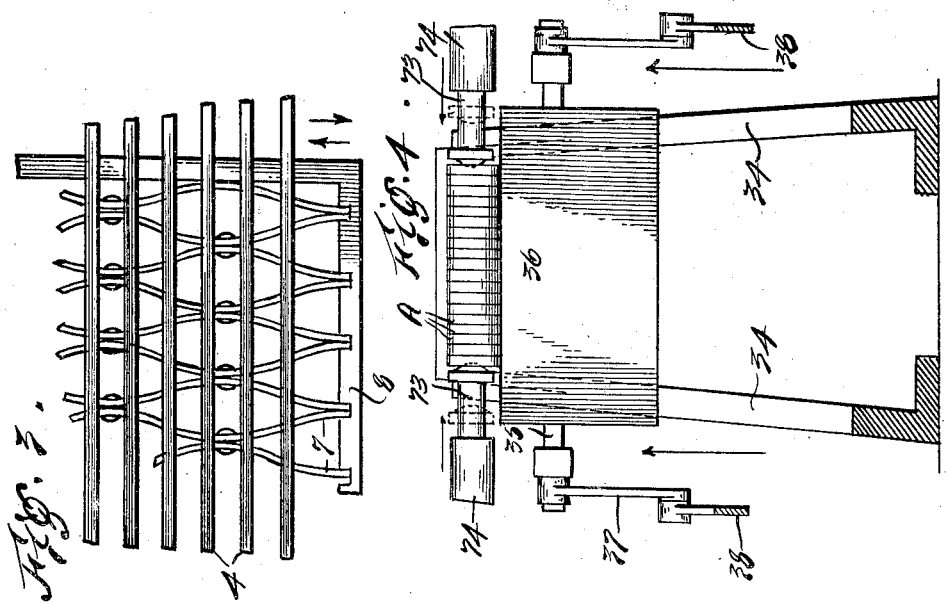
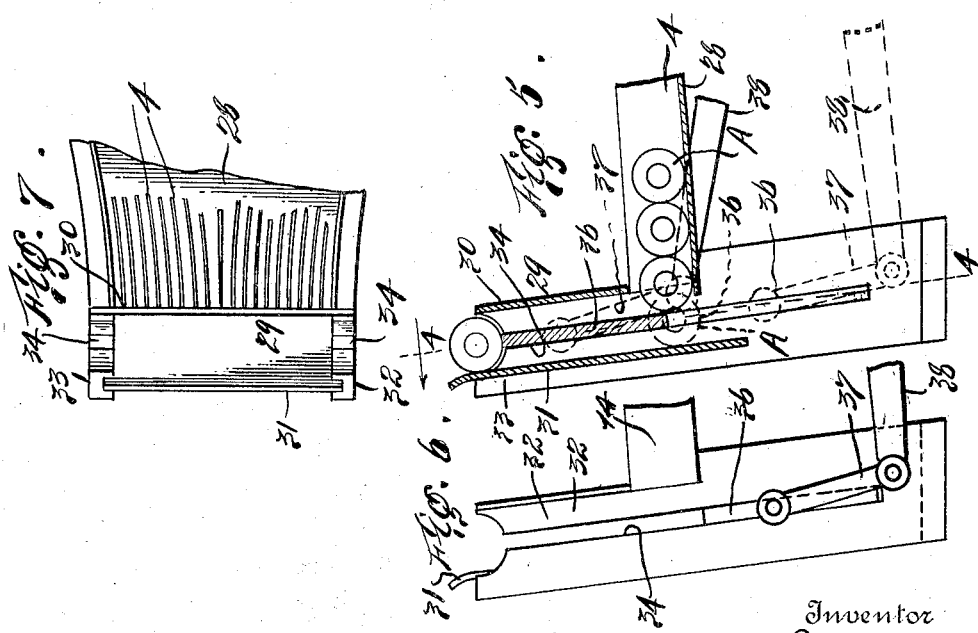
Inventor
E. D. Anderson + C. Beckman
By their Attorney
P. R. Bourne Nov. 25, 1924.
E. D. ANDERSON ET AL
1,516,902
WRAPPING AND LABELING MACHINE
Filed Feb. 27, 1920 11 Sheets-Sheet 6
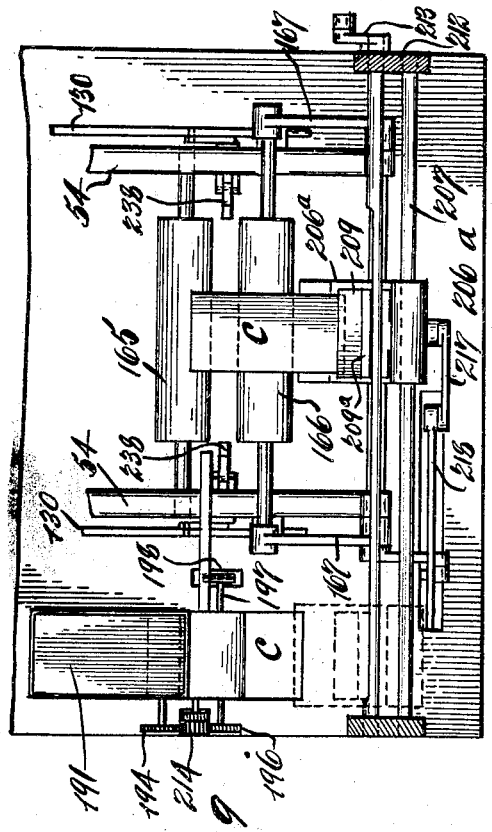
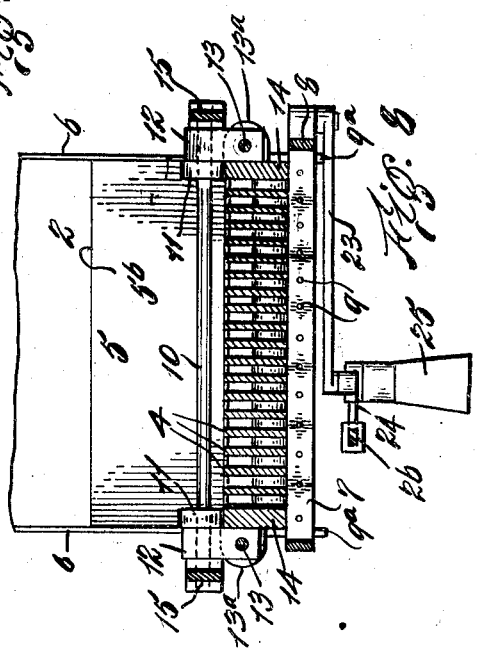
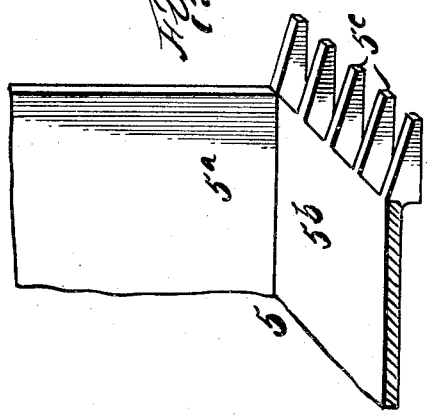
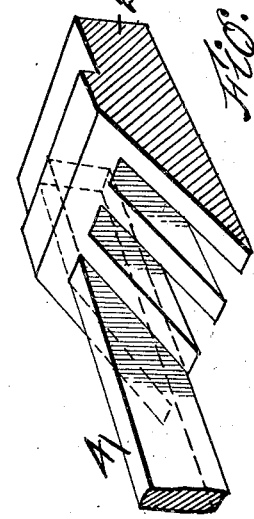
Inventor
E. D. Anderson + C. Beckman
By their Attorney
F. F. Bourne

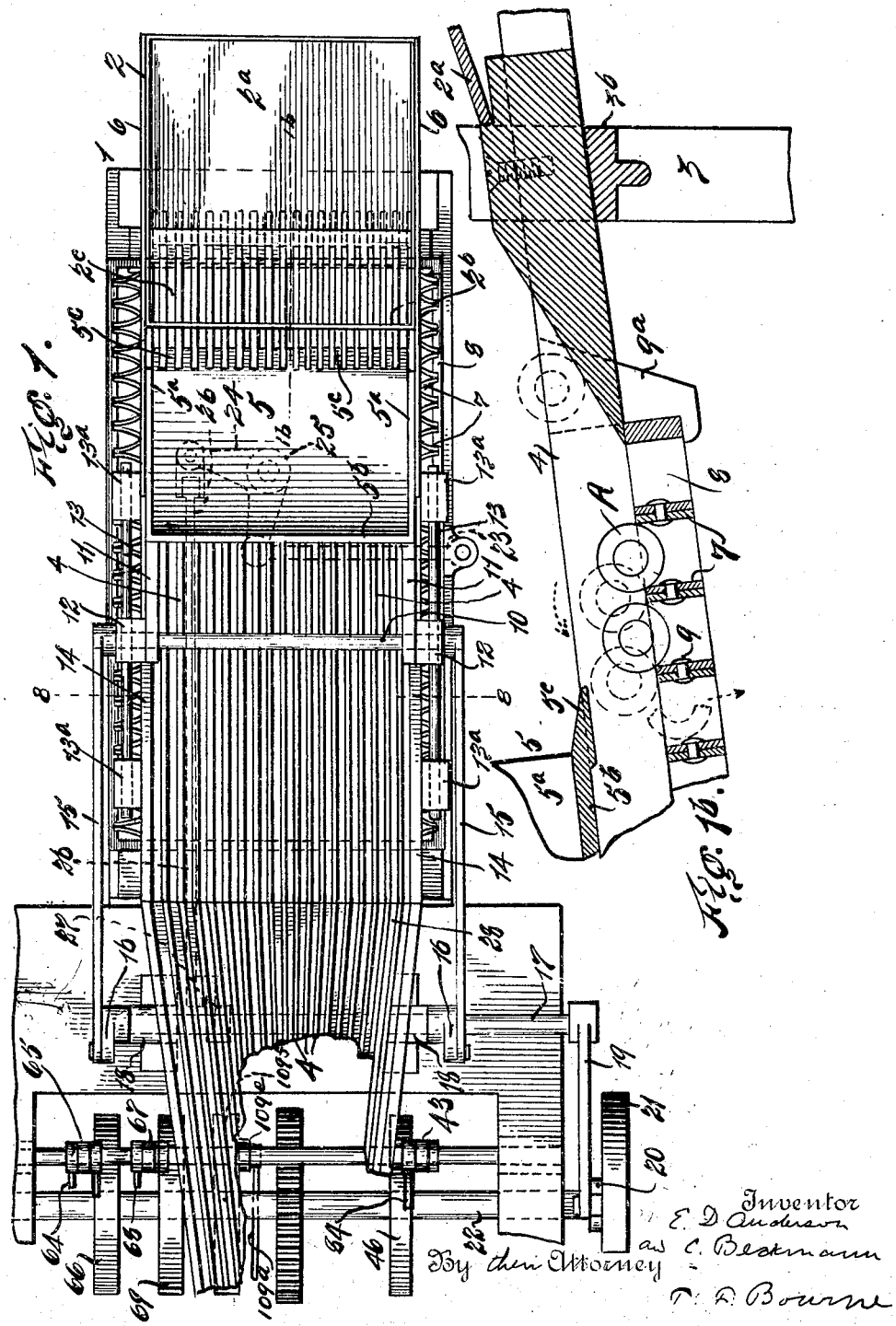

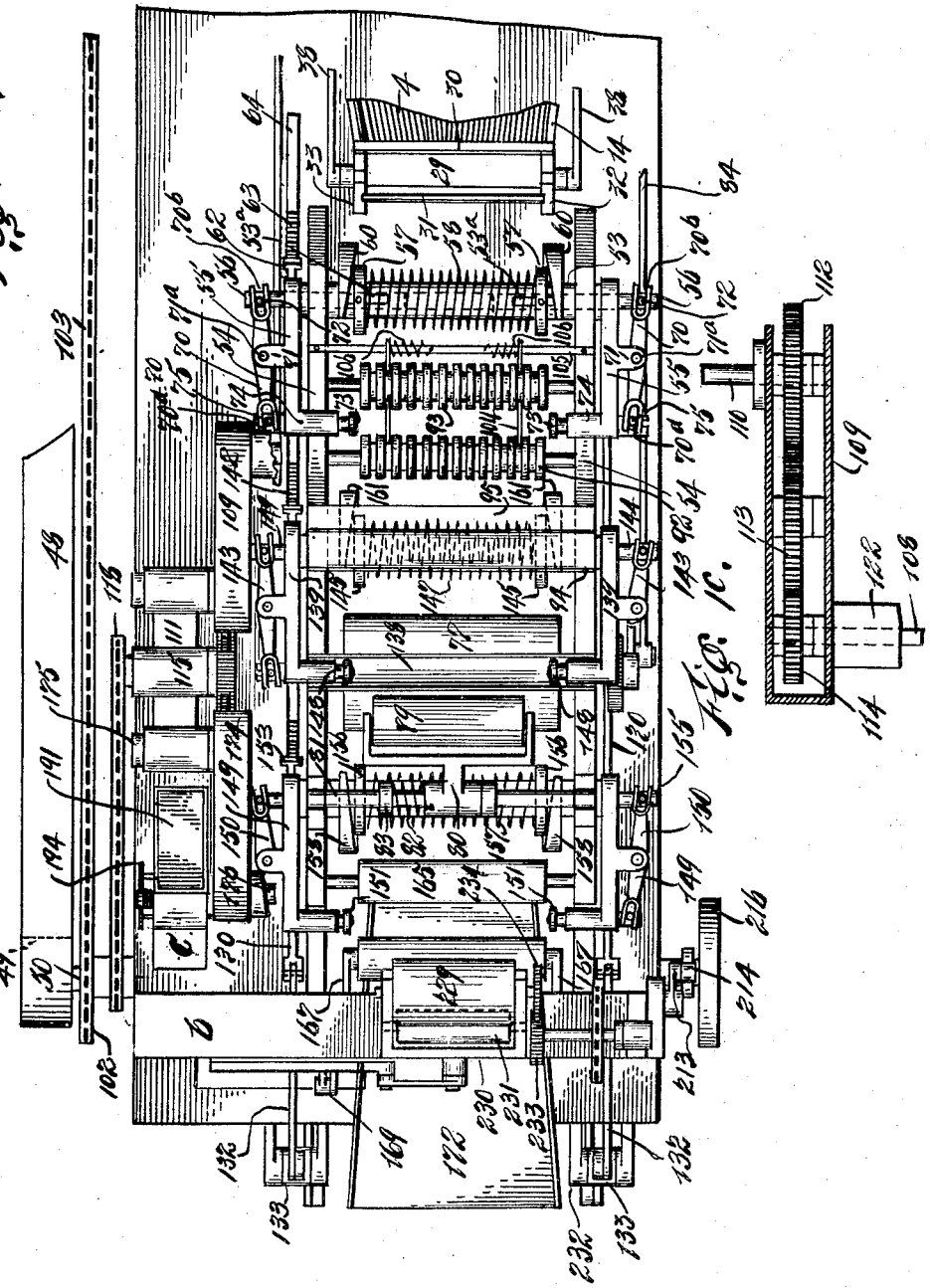

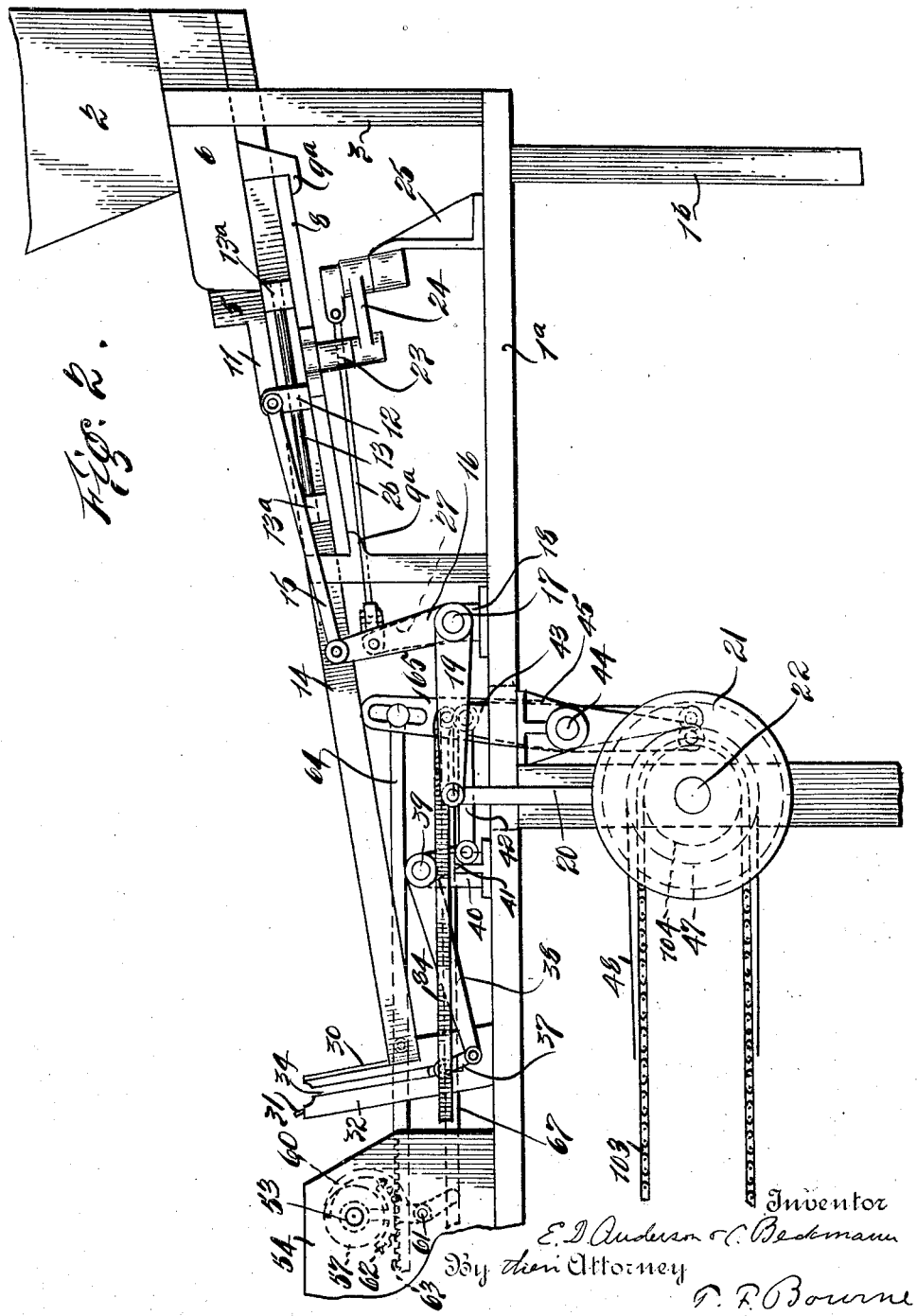

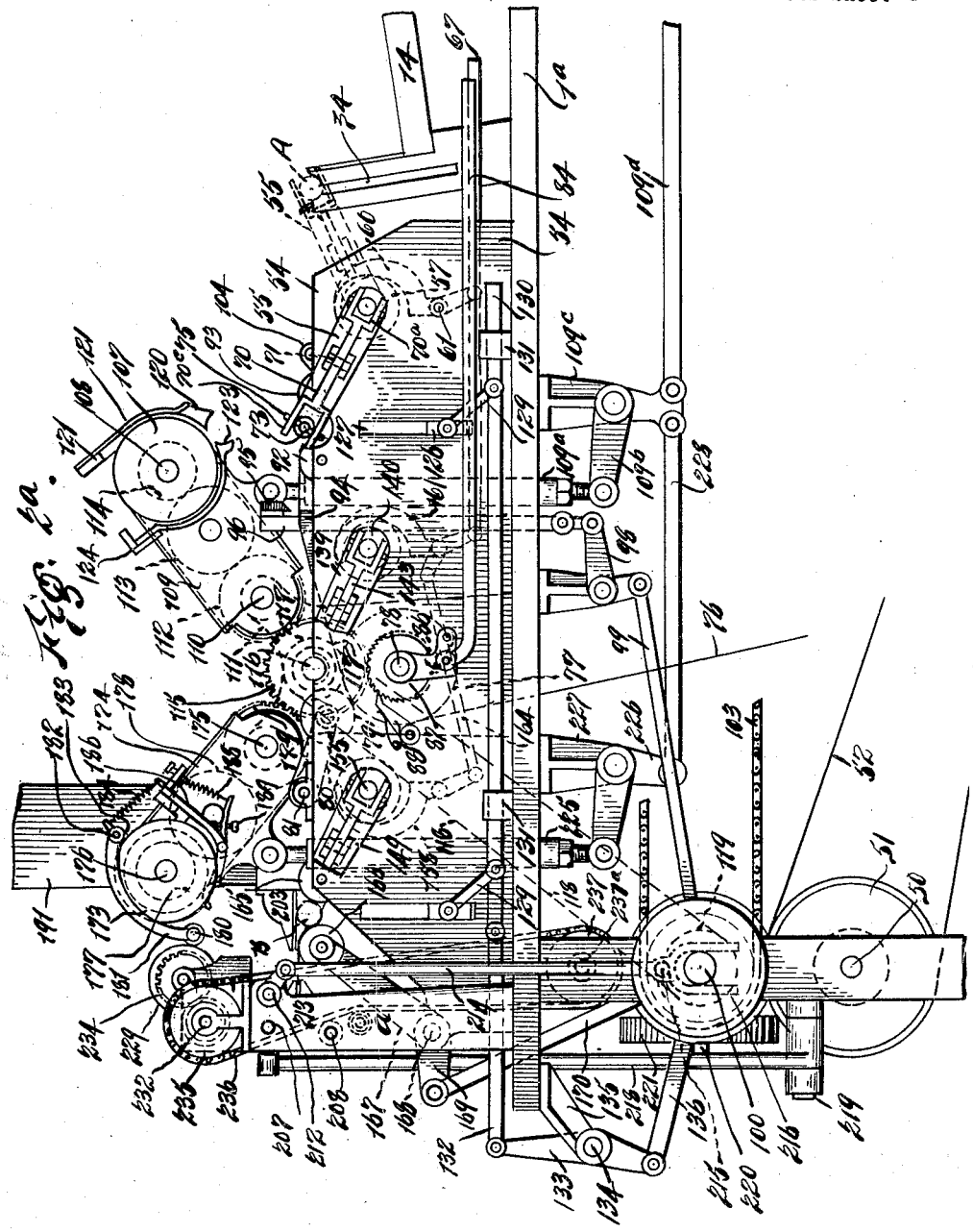

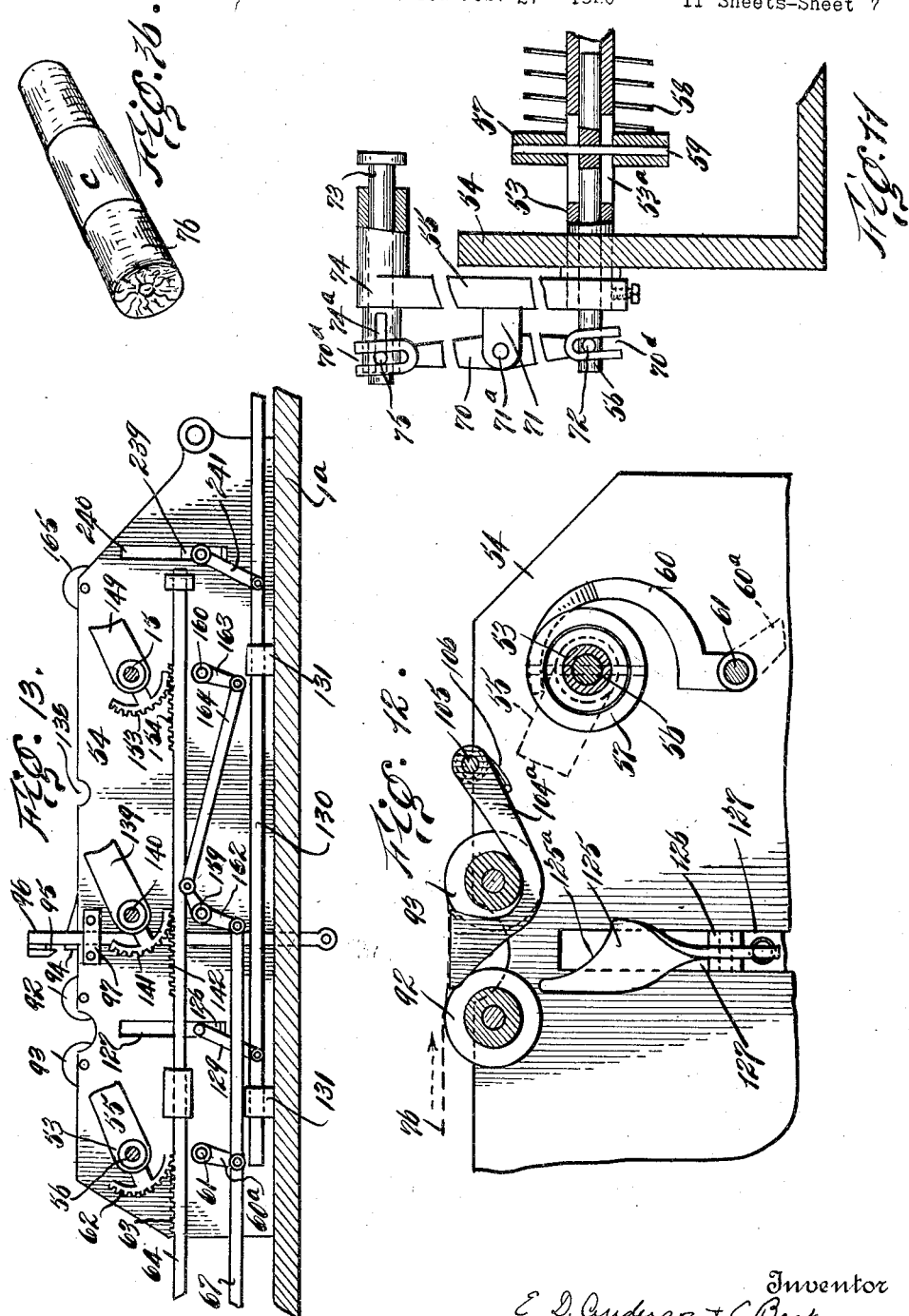

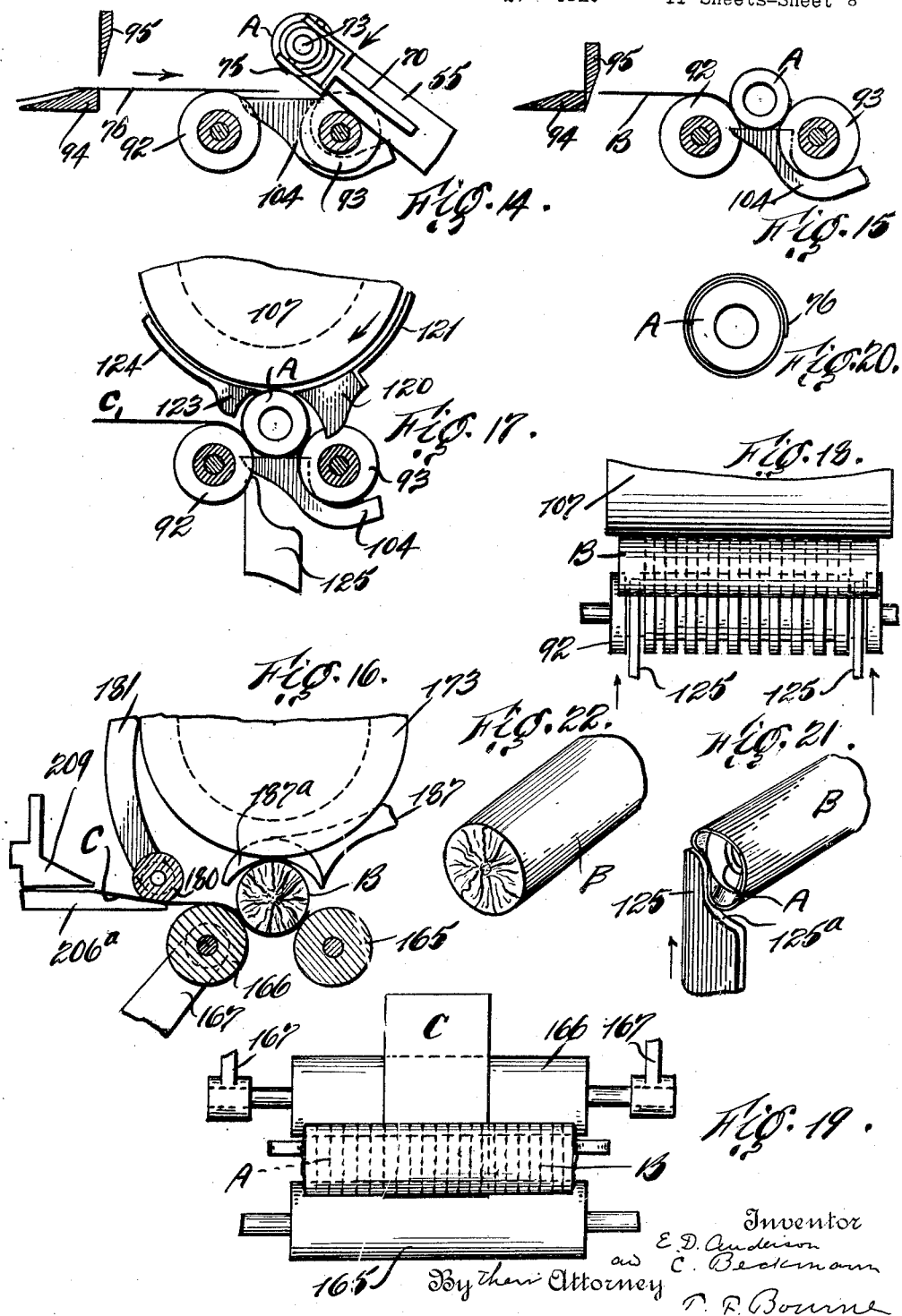

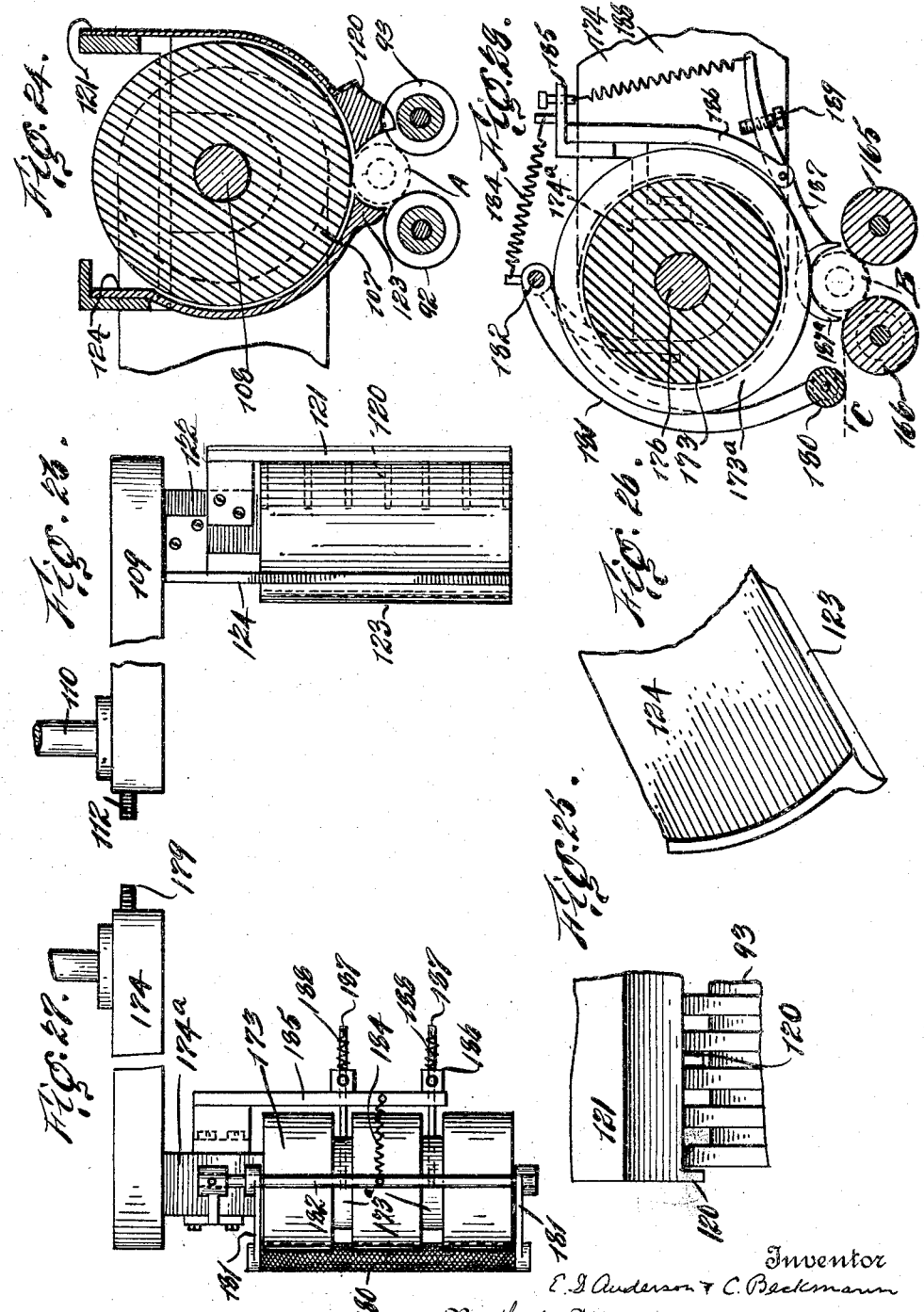

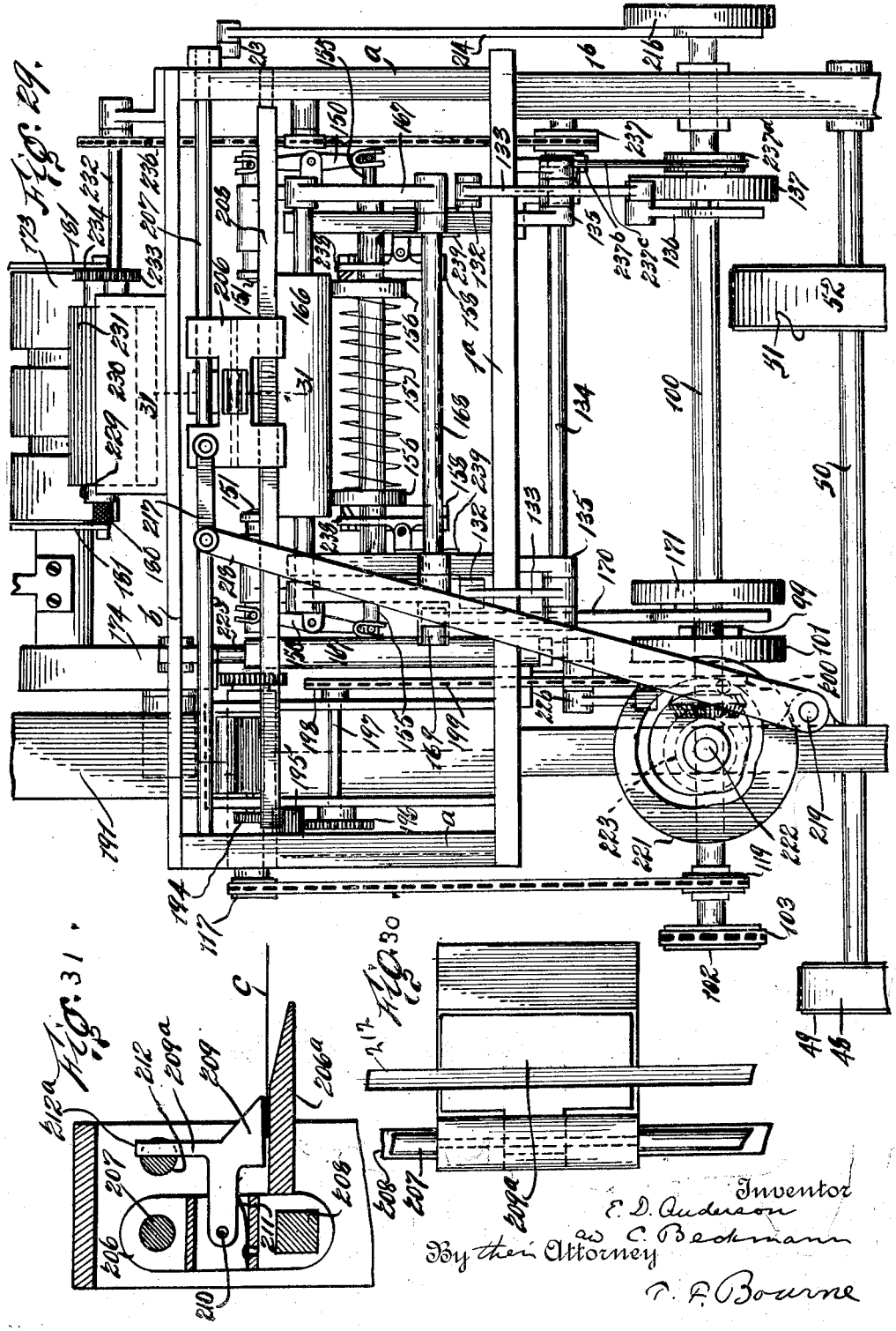

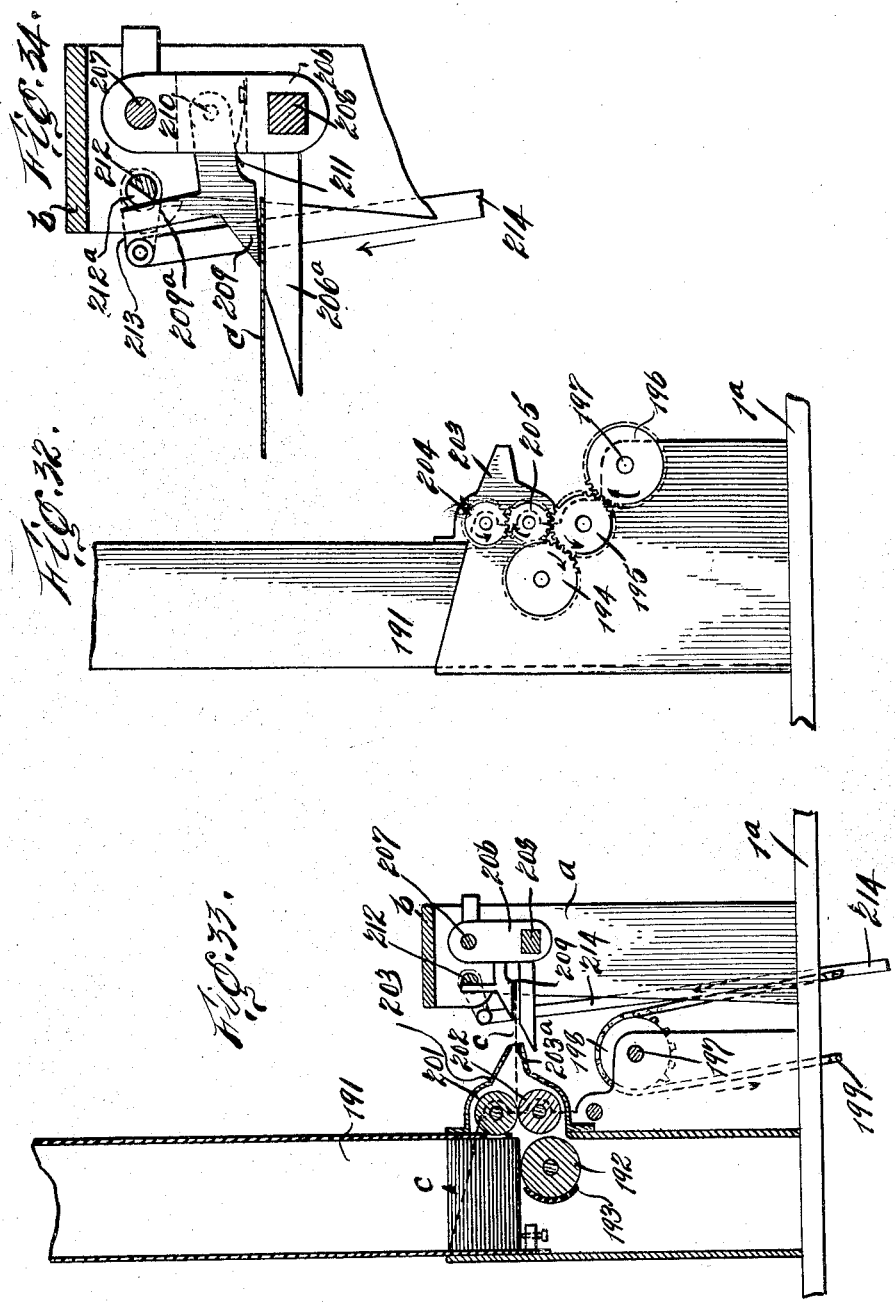

Patented Nov. 25, 1924.

1,516,902

UNITED STATES PATENT OFFICE.

ERNEST D. ANDERSON AND CARL BECKMANN, OF NEW YORK, N. Y., ASSIGNORS TO E. D. ANDERSON, INC., OF NEW YORK, N. Y., A CORPORATION OF NEW YORK.

WRAPPING AND LABELING MACHINE.

Application filed February 27, 1920. Serial No. 361,673.

*To all whom it may concern:*

Be it known that we, ERNEST D. ANDERSON, a citizen of the United States, and resident of New York city, borough of Manhattan, county and State of New York, and CARL BECKMANN, a subject of Germany, and resident of New York city, borough of Queens, and State of New York, have invented certain new and useful Improvements in Wrapping and Labeling Machines, of which the following is a specification.

This invention has reference to improvements in machines adapted to supply articles in bulk and assemble a desired number of such articles successively and enclose them in wrappers to provide wrapped packages of articles, such as candies and the like. Where certain kinds of articles, such as candied mints, are assembled in bulk there are liable to be broken pieces of the articles, loose particles and sugar in the mass, and one of the objects of the invention to separate the articles to be wrapped from such broken and loose pieces, etc., to prevent the latter from being wrapped with the correct articles.

Another object of the invention is to provide improved means for assembling a desired number of articles for each package, to enclose the same in wrappers, and apply labels upon the wrappers, whereby packages of wrapped labeled articles may be delivered successively.

In carrying out the invention the machine is provided with a hopper or magazine to receive articles in bulk, means to agitate the articles to separate the broken or waste parts from the proper articles to be wrapped and assemble a definite number of articles side by side, means to transfer the articles from their assembling position to wrappers, means to enclose the articles in the wrappers, means to apply labels on the wrapped articles, and means to seal the labels on the wrapped articles.

This invention also comprises novel details of improvement and combinations of parts that will be more fully hereinafter set forth and then pointed out in the claims.

Reference is had to the accompanying drawings forming part hereof wherein—

Figures 1 and 1ª are plan views of the machine to be read together, with Figure 1 at the righthand side, parts being omitted;

Fig. 1ᵇ is an enlarged detail section substantially on the line 1ᵇ—1ᵇ in Fig. 1;

Fig. 1ᶜ is a sectional detail illustrating transmission gears;

Figs. 2 and 2ª are side views of a machine to be read together, with Fig. 2 at the righthand side;

Fig. 3 is an enlarged fragmentary detail of devices for separating articles or goods from waste;

Fig. 4 is a sectional elevation of assembling devices for the articles, taken substantially on the line 4—4 in Fig. 5;

Fig. 5 is a vertical section through Fig. 4;

Fig. 6 is a detail side view of Fig. 4;

Fig. 7 is a fragmentary plan view of Fig. 5;

Fig. 8 is a cross section substantially on the line 8—8 in Fig. 1;

Figs. 9 and 10 are fragmentary perspective views enlarged of part of an agitator for separating articles from waste;

Fig. 11 is an enlarged detail sectional view illustrating one of the transferring devices for the articles;

Fig. 12 is an enlarged detail side view of part of the wrapping devices;

Fig. 13 is an enlarged detail side view, looking from the top of Fig. 1ª, illustrating operating parts for wrapping and labeling devices;

Figs. 14, 15, 16, 17, 18 and 19 are detail diagrammatic views illustrating steps in the operation of applying wrappers and labels to the articles;

Fig. 20 is an end view illustrating wrapped articles before the end of the wrapper is closed in;

Fig. 21 illustrates the step of closing the end of the wrapper on the articles;

Fig. 22 illustrates an end portion of a package before the label is applied upon the wrapper;

Fig. 23 is a detail plan view of the pressure roll for wrapping the articles;

Fig. 24 is an enlarged cross section through Fig. 23;

Fig. 25 is a fragmentary detail perspective view of a portion of one of the wrapper guides of Fig. 24;

Fig. 26 is a fragmentary detail of part of Fig. 24;

Fig. 27 is a detail plan view of label applying devices;

Fig. 28 is an enlarged cross section of Fig. 27;

Fig. 29 is an enlarged end view of the machine looking from the left in Fig. 2ª;

Fig. 30 is an enlarged detail plan view of part of the labeling devices;

Fig. 31 is an enlarged cross section on line 31, 31 of Fig. 29;

Fig. 32 is a detail side view of the label magazine;

Fig. 33 is a vertical section of parts shown in Fig. 32;

Fig. 34 is an enlarged detail section of part of Fig. 33;

Fig. 35 (Sheet 6) is a sectional plan view of the labeling devices; and

Fig. 36 (Sheet 7) is a detail perspective of a labeled package.

The main frame of the machine is indicated at 1 and it may be of any suitable construction, being shown provided with a table or plate 1ª and legs 1ᵇ. At 2 is a magazine or hopper which may be supported in an elevated position upon the main frame by means of uprights 3, (Figs. 1 and 2). Suitably spaced bars or rails 4 extend in a forwardly, downwardly inclined direction from the bottom of the hopper and are so spaced as to receive articles A, such as candies, on edge therebetween. The bottom 2ª of hopper 2 over bars 4 is spaced from the forward wall 2ᵇ of the hopper providing a space 2ᶜ for passage of articles A to said bars, (Fig. 1). Bars 4 are supported under the hopper by cross bars 3ᵇ, (Fig. 1ᵇ). An agitator 5 is slidably supported over bars 4, having sides 5ª and an end wall 5ᵇ spaced from the hopper, (Figs. 1, 1ᵇ and 9). The agitator is reciprocative between spaced walls 6 extending forwardly from the hopper. Below the bars 4 are cross bars 7 extending substantially transversely to bars 4 and which are shown carried by frame 8 which is shown guided upon ways or brackets 9 supported by the main frame, (Figs. 1ᵇ, 2 and 8), whereby the bars 7 may be reciprocated beneath bars 4. The bars 7 are shown bent in ogee form and alternately secured together by rivets 9, (Fig. 3), whereby irregularly disposed openings transversely of the machine are provided between bars 7 below bars 4. The agitator 5 is reciprocated lengthwise of the machine by means as follows:—A cross bar 10 is attached to projections 11 from the agitator, which bar is received in blocks 12 slidable on guide rods 13 secured to spaced blocks 13ª secured to side walls 14 carried by the machine, (Figs. 1, 2 and 8). The ends of bar 10 are connected to links 15 that are pivotally connected to rock arms 16 secured upon shaft 17 journalled in bearings 18 on the main frame, (Figs. 1 and 2). Crank arm 19 is secured on shaft 17 and connected with link 20, (Fig. 2), that is co-operative with cam 21 secured on shaft 22 journalled on the main frame, (Figs. 1 and 2), whereby as said cam is rotated the agitator will be reciprocated. Frame 8 is pivotally connected with a link 23 which is pivotally connected with bell crank lever 24 journalled upon bracket 25 secured upon the main frame, (Figs. 1, 2 and 8), which bell crank is pivotally connected by link 26 with a rock arm 27 secured on shaft 17, (Figs. 1 and 2), whereby as said shaft is rocked the frame 8 with bars 7 will be reciprocated transversely of the machine. By the means described the agitator 5 is reciprocated to agitate the articles A on bars 4 to cause loose and broken pieces of the articles, small particles, sugar, etc., to sift through between the bars 4, and the reciprocation of the bars 7 causes loose pieces, sugar, etc., to fall away below. The inner edge of the agitator 5 is shown forked or comb-like at 5ᶜ to straddle and pass between the adjacent parts of bars 4 to push and agitate the articles. Notwithstanding that the articles may be deposited loosely in mass in the hopper the agitation of the articles upon bars 4 and the reciprocating action of the comb parts 5ᶜ of the agitator in the mass will cause the several articles to enter edgewise between the bars 4. The downward inclination of bars 4 and the transverse reciprocations of the bars 7 will cause the articles A to roll forwardly over bars 7 to a bottom plate 28, on which the articles roll on edge, (Figs. 1, 1ª, 4, 5 and 7). The parts 4 and 28 together constitute a sort of chute having spaced channels for assembling the articles side by side. Near the delivery ends of bars 4 the latter and side walls or rails 14 converge to and communicate with an upwardly disposed article transferring guideway 29, formed between spaced side walls 30, 31 and spaced end walls 32, 33, secured upon table 1ª, (Figs. 1ª, 2, 2ª, 4, 5, 6 and 7). The wall 30 at its lower end terminates over bars 4, and wall 31 opposes the ends of said bars to admit series of articles A, assembled between bars 4 side by side, to guideway 29 from the spaces between bars 4 for each package of articles to be formed, (Fig. 5). The number of spaced bars 4 determines the number of articles collected side by side for each package, (Fig. 4). Each series of articles A assembled at the ends of bars 4 is to be raised through guideway 29 to be transferred to a wrapper. In the example illustrated the side walls 32, 33 are slotted vertically at 34 to receive the ends of a transferring plate 36 reciprocative between the end walls 32, 33, (Figs. 4 and 5). When said plate is lowered its upper edge will permit the lowermost series of articles collected at the delivery ends of bars 4 to roll upon said plate. When the plate is raised it will elevate said articles to the upper part of guideway 29 and the plate is of sufficient depth to oppose the remaining articles between bars 4 to retain them until the plate is again lowered. Means to periodically raise and lower plate 36 are arranged as follows:—Links 37 are pivotally attached to projections 35 from transferrer plate 36 and to arms 38 secured to cross shaft 39 journalled in brackets 40 on table 1ª, (Fig. 2). Shaft 39 has a crank arm 41 connected by link 42 with rock arm 43 carried by rod 44 supported by brackets 45 on the main frame, (Fig. 2). A cam 46 on shaft 22 actuates arm 43 to cause rocking of arms 38 to raise and lower plate 36. Shaft 22 has a pulley 47 receiving a belt 48 passing over a pulley 49 secured on shaft 50 journalled in the main frame, (Figs. 1ª, 2 and 29). Main drive shaft 50 may be driven by pulley 51 receiving belt 52 from a suitable power source, (Fig. 2ª).

When a series of assembled articles are raised by transferrer plate 36 to the upper end of guideway 29, (Figs. 4 and 5), transferring devices engage the articles and deposit them in series upon wrappers successively for each package. A tubular shaft 53 is journalled between spaced supports 54 on table 1ª, and near the ends of said shaft arms 55 are received outside of said supports, (Figs. 1ª, 11 and 13). Pins or rods 56 are slidable within the bore of shaft 53 and project through and beyond said arms 55. Near the ends of shaft 53 are loose collars or disks 57 thereon, a spring 58 coiled around said shaft pressing against said disks tending to spread them apart, (Figs. 1ª and 11). Pins 59 pass through the disks 57, through slots 53ª in shaft 53, and through holes in the pins 56, (Fig. 11), whereby the disks can shift the pins 55 longitudinally, and said parts will rotate together. Cam members 60 are carried on shaft 61 journalled upon the supports 54 and are co-operative with disks 57 to move them in opposition to spring 58, (Figs. 2, 2ª, 12 and 13). The arms 55 are rocked in unison and one arm has a segmental rack 62 in mesh with reciprocative racks 63 on bar 64, (Figs. 1ª, 2 and 13). Bar 64 is pivotally connected with rock arm 65 journalled on shaft 44, (Figs. 1 and 2). Arm 65 is co-operative with a cam 66 on shaft 22, whereby as said cam is rotated the rack 63 will be reciprocated and arms 55 will be rocked together with shaft 53. The cams 60 are rocked in timed relation to arms 55 by means of link 67 that is connected to cam-arm 60ª, (Fig. 13) and to arm 68 loose on shaft 44 and operated by cam 69 secured on shaft 32, (Figs. 1, 2 and 13). The pins or rods 56 operate arms 70 pivoted at 71ª to rock on lugs 71 on arms 55, (Figs. 1ª, 2ª and 11). Arms 70 are shown forked at 70ª, (Fig. 2ª), to straddle pins or rods 56, and said arms are also shown forked at 70ᵇ to receive pins 72 projecting from pins 56, (Figs. 1ª and 11), whereby as the latter are moved the arms 70 will be rocked. The arms 55 carry slidable grippers 73 located in bores in hubs 74 on said arms to engage the series of articles A at guideway 29, before referred to, (Figs. 1ª, 4 and 11). The arms 70 are shown forked at 70ᶜ, (Fig. 2ª) to receive the hubs 74 and said arms are also shown forked at 70ᵈ, (Figs. 1ª and 11), to receive pins 75 projecting from the corresponding grippers 73 into said forks 70ᵈ through slots 74ª in hubs 74, (Fig. 11). The arrangement described is such that while the series of articles A are being raised by plate 36 to the upper part of guideway 29 the rack 63 will cause arms 55 to be swung to present the gripper 73 on opposite sides of the series of articles, (Fig. 4), the rod 67 meanwhile operating cams 60 in such a manner that the grippers 73 will be spread apart to receive the assembled series of articles therebetween. When arms 55 come to rest, (see dotted lines Fig. 2ª) the cams 60 will operate to permit the disks 57 to be pushed by spring 58 to tilt arms 70 which in turn will cause the grippers 73 to approach and grip the series of articles A therebetween. Thereupon the rod 64 will be operated to cause arms 55 to swing over to carry the series of articles from guideway 29 to deposit said articles assembled side by side upon a wrapper B, and cam 60 will be operated to push disks 57 toward each other to tilt arms 70 to spread the grippers 73 and release said series of articles to be wrapped, said arms 55 again being operated for picking up and transferring a succeeding series of articles A raised by plate 36 through guideway 29, and so on successively for each series of articles to be wrapped. The web or strip 76 for the wrappers, which may be of tin foil or other suitable material, may pass from a roll of such material suitably supported to be fed over a feed roller 77 located between supports 54 and carried by shaft 78 journalled in said supports, a pressure roll 79 bearing upon the web or strip on roll 77, (Figs. 1ª and 2ª). Roll 79 is pivotally carried by a frame 80 loose on rod 81 carried by supports 54, a spring 82 secured to frame 80 and to collar 83 on said rod aiding in pressing roll 79 against strips 76. A rod 84 is pivotally connected with arm 85 hung on shaft 78 and having a pawl 86 operating with ratchet 87 secured on said shaft to rotate roll 77 to feed wrapper strip 75 a required distance for each wrapper, (Fig. 2ª). A back-stop pawl 88 co-operative with ratchet 87 prevents reverse rotation of the latter. Rod 84 is connected to rock arm 43 loose on shaft 44 operative by cam 46 on shaft 22 whereby roll 77 may be actuated. Strip 76 is fed by roll 77 over a pair of spaced rollers 92, 93 journalled between supports 54 in position to receive a series of articles A between said rollers, (Figs. 1ª, 15 and 17). Rollers 92, 93 are shown annularly grooved with the grooves of the rollers opposing, whereby the circular articles A may be rolled in the wrappers respecting such grooves. Adjacent to the roller 92 a stationary cutter 94 is located, being secured to and extending across between the supports 54, a movable cutter 95 being co-operative with the cutter 94, (Figs. 1ª, 2ª, 13 and 14, 15). The cutter 95 is carried by vertically disposed rod 96 guided in bearing 97 on one of the supports 54, (Figs. 2ª and 13), which rod is pivotally connected to bell crank 98 connected with rod 99 which is forked to be guided upon shaft 100 and cooperative with cam 101 on said shaft, (Figs. 2ª and 39), whereby each time the feed roller 77 feeds strip 76 over knife 94 to the rollers 92, 93 to an extent sufficient for web or wrapper B the knife 95 will be drawn down to cut off the web or wrapper length, (Fig. 15), and will be raised for the next operation, (Fig. 14). Shaft 100 is journalled in bearings on the main frame, (Fig. 29), and is provided with a sprocket wheel 102 receiving a chain 103 passing over sprocket wheel 104 on shaft 22 whereby shaft 100 is rotated in proper timing, (Figs. 1ª, 2, 2ª and 29). To guide the wrapper web or strip 76 over the space between rollers 92, 93, movable guides 104 are pivotally carried upon a rod 105 extending between and secured to supports 54, (Fig. 1ª), springs 106 secured to said rod and co-operative with the said guides 104 serving normally to raise said guides, (Fig. 12). The guides are shaped to operate with their free ends between the grooves of rollers 92, 93, and the shank portions of the guides operate in grooves of roller 93, whereby in normal position the guides will provide a substantially level surface between said rollers, over which the webs or wrappers B will pass for the articles to be deposited thereon. At 107 is a relatively large roll movably supported to roll the articles A resting upon the wrappers on rollers 92, 93 to enclose said articles in the wrappers. Said roll 107 is mounted upon shaft 108 carried by arm 109 that is supported at the opposite end by a stud 110 carried by bracket 111 secured upon the main frame, (Figs. 1ª, 2ª and 23). Said arm is provided with intermeshing gears 112, 113, 114, (Figs. 1ᶜ and 2ª), the arm being shown hollow to contain said gears, the gear 114 being secured to roll 107 for rotating the latter. A gear 115 is in mesh with gear 112 and is carried by shaft 116 journalled in bracket 111, which shaft is provided with a sprocket wheel 117, (Figs. 2ª, 29), receiving a chain 118 passing over pulley 119 on shaft 100, (Fig. 29). The arrangement is such that the arm 109 may be swung back and forth with roller 107 and the latter through the gearing described will be rotated as required to cause the wrapper B to be wound around the articles A upon rollers 92, 93 when roll 107 rotates against the articles. Guiding fingers 120 are provided below roll 107 adapted to fit in grooves of rollers 93, which fingers are carried by a support 121 attached to hub 122 extending from arm 109, (Figs. 2ª, 17, 23, 24 and 25). At 123 is a guard opposed to fingers 120 and spaced therefrom, shown carried by member 124 secured to hub 122 of arm 109, which guard extends along and over roller 92 and against which guard the packages being wrapped are guided for retention in proper position between rollers 92, 93. After the assembled series of articles A have been placed upon the wrapper B upon the rollers 93, 92 the arm 109 is caused to descend to bring roll 107 into contact with articles A and the rotation of such articles causes rollers 92, 93 to rotate, whereby the wrapper will be wrapped around articles A, (Figs. 15, 17, 20, 21 and 22). The arm 109 is raised and lowered in timed relation to the rocking of arm 55 by means of a link 109ª pivotally connected to said arm and to a bell crank 109ᵇ pivoted on a bracket 109ᶜ carried by table 1ª, (Fig. 2ª), which crank arm is pivotally connected to a rod 109ᵈ that is reciprocated by arm 109ᵉ loose on shaft 44 and actuated by cam 109ᵈ on shaft 22.

While a wrapper is being folded around a series of articles, with the end portions of the wrapper projecting beyond the articles (Fig. 21), wrapper folding members 125 are caused to engage the projecting ends of the wrappers to fold or tuck them against the endmost articles. Members 125 are shown recessed at their upper edges at 125ª to gradually engage and fold in projecting end portions of the wrappers as said members approach the latter, (Figs. 12 and 21). The members 125 are secured to slide blocks 126 guided in vertical slots 127 in supports 54, (Figs. 2ª, 12 and 13), which blocks are pivotally connected by links 129 with rods 130 guided in bearings 131 on the opposite sides of the machine, whereby said members 125 will be caused to rise and descend. When the wrapper has been sufficiently wound around the series of articles A the fingers 125 will engage projecting portions of the wrapper whereby continued rotation of the wrapper with the articles will cause the end portions of the wrapper to be closed in against the endmost articles, as illustrated in Figs. 16, 22 and 36. The rods 130 are reciprocated by means of links 132 pivotally connected to said rods and to rock arms 133 carried by shaft 134 supported by brackets 135 carried by the main frame, (Figs. 1ᶜ, 2ª and 29). One of the arms 133 is pivotally connected with link 136 that is co-operative with cam 137 secured on shaft 100, (Fig. 29) for rocking arms 133. After a package has been formed and its ends closed in, as stated, the same is removed from the rollers 92, 93, the roll 107 rising at the required time for such purpose.

In accordance with this invention labels are applied upon the packages at a position suitably distant from rollers 92, 93. For convenience of operation the packages are stepped from the rollers 92, 93 to an intermediate position and again stepped therefrom to a position to receive the labels. A rest is shown for the packages at 138, (Fig. 1ª) in the form of an open trough carried by supports 54. Rocking transferring devices are shown for the packages constructed substantially the same as arms 55 and 70 and the grippers 73, the main arms for such purpose being indicated at 139 pivotally supported upon shaft 140 on uprights 54 and provided with segmental racks 141 engaging rack teeth 142 on bars 64, (Figs. 1ª and 13), whereby arms 55 and 139 will be rocked in consonance in the same direction by bar 64. Rock arms 143 are pivotally carried by arms 139 and connected to pins or rods 144 connected with disks 145 on shaft 140. Spring 147 is between the disks 145 to spread them, (Figs. 1ª, 2ª and 13), cams 161 operating with the disks in the manner before described regarding similar parts 57, etc. Grippers 148 carried by arms 139 are operated by arms 143 in such a manner as to grip the package on rollers 92, 93 and carry such package with arms 139 to deposit the package in rest 138. Another pair of arms 149 carry arms 150 and have grippers 151, the arms 149 being upon shaft 152 upon supports 54. One of the arms 149 is provided with segmental rack 153 in mesh with rack teeth 154 on bar 64, (Fig. 13), for rocking the arms 149 in consonance and in the same direction with the rocking of arms 55 and 139. Pins 155 connected with arms 150 and having disks 156 operated by spring 157 and co-operative with cams 158 operate in manner before described regarding the parts for arms 55, to cause the grippers 151 to grasp the package in rest 138 and transfer it to label receiving position. The shafts 159 and 160 of cams 161 and 158, (Figs. 1ª and 13), are connected with bar 67 by means of arms 162, 163 and link 164, (Fig. 13), whereby all of said cams will operate similarly together to at the same time spread the grippers 73, 148 and 151, since it is desirable that corresponding operations occur simultaneously.

When the package B carried by grippers 151 has been brought to label receiving position it is deposited upon rollers 165, 166, (Figs. 1ª, 2ª, 16 and 28). The roller 165 is journalled between supports 54 and the roller 166 is carried by rock arms 167 carried by shaft 168 journalled in the main frame. Shaft 168 is provided with a crank arm 169, (Figs. 2ª and 29) which is pivotally connected with link 170 co-operative with cam 171 secured on shaft 100, whereby roller 166 will be caused to approach roller 165 to retain a package while being labeled, and roller 166 will move away from roller 165 to release the labeled package for deposit in a delivery chute 172, (Fig. 1ª).

Above rollers 165, 166 is a label applying roll 173 pivotally carried by an arm 174 journalled at the inner end upon a shaft 175 carried by bracket 111, (Figs. 1ª, 2ª). The shaft 176 of roll 173 is journalled on arm 174 and carries a gear 177 in mesh with a gear 178 journalled in said arm and in mesh with a gear 179 on shaft 175 in mesh with gear 115. Said gearing and arm are substantially the same as shown in Fig. 1ᶜ (before described) whereby gear 115 will cause rotation of roll 173 in any position of arm 174. A pasting roller 180 is journalled upon spaced arms 181 secured to a shaft 182 carried by a bracket 183 supported by hub 174ª of arm 174, (Figs. 2ª, 27, 28, 29). A spring 184 connected with shaft 182 and with a stop 185 resiliently retains roll 180. Stop 185 is carried by hub 174ª, and is shown in the form of a bar having depending arms 186 pivotally supporting label guides 187. Said guides are shown operative in grooves 173ª in roll 173 and having curved heads 187ª to engage the labels and packages, (Fig. 28) on rollers 165, 166. Springs 188 connect the guides with stop 185 tending to cause the guides to bear on the labels and the packages B from rollers 165, 166, screws 189 on the guides co-operative with arms 186 limiting the operation of the guides, (Figs. 2ª and 28).

The labels C to be wrapped and pasted around the packages B are shown stacked in a magazine 191 carried by table 1ª, (Figs. 1ª, 2ª, 29, 32, 33, 35). Means to feed the labels successively from the magazine are arranged as follows:—A roller 192 is journalled below the labels so they may rest upon it, said roller having a tenacious member 193 extending part way around it to periodically and successively engage the lowermost labels to push them from beneath the stack, (Fig. 33). Roller 192 has a gear 194 in mesh with a gear 195 that meshes with a drive gear 196 journalled on the magazine frame, (Fig. 32). The shaft 197 of gear 196 has a sprocket wheel 198 receiving a chain 199 from a sprocket wheel 200 on shaft 100, (Figs. 29 and 33), whereby roller 192 is rotated to cause its member 193 to push the labels C successively between feed rollers 201, 202. Said feed rollers are journalled in a funnel-like guide 203 on the side of magazine 191. Roller 201 has a gear 204 in mesh with a gear 205 secured to roller 202, the gear 205 being in mesh with gear 195, (Fig. 32). The arrangement is such that as the labels are projected by rotary member 193 between rollers 201, 202, the latter will feed the labels through the reduced slotted end 203$^a$ of guide 203. The portion of the label projecting from said guide is in position to be engaged by a transferring device to place the label in position over the rollers 165, 166 to receive the wrapped articles or packages B thereon, (Figs. 16, 19 and 35). Said transferring device is arranged and operated as follows:—A carrier block 206 is slidably mounted upon spaced cross bars 207, 208 carried by uprights $a$ of the main frame, (Fig. 29). The carrier 206 is provided with a label gripper 209 pivotally supported on the carrier at 210, the gripper extending over the extension 206$^a$ of the carrier to grip a label C thereon, (Fig. 31). A spring 211 secured on the carrier tends to raise the gripper from the label and a projection 209$^a$ of the gripper co-operates with a rod 212 for operation of the gripper. Rod 212 is journalled on uprights $a$ and has a flat face 212$^a$ on one side, (Figs. 31 and 34), along which projection 209$^a$ travels. Rod 212 is rocked to tilt projection 209$^a$ and gripper 209 for gripping and releasing label C. When face 212$^a$ opposes projection 209$^a$ gripper 209 will be spaced from extension 206$^a$ of the carrier to receive an end portion of label C therebetween as the carrier travels, (Fig. 31), and when rod 212 is rocked it will cause gripper 209 to clamp the label on extension 206$^a$ for transferring the labels from guide 203 to a position over rollers 165, 166. Rod 212 is shown provided with an arm 213 pivotally connected with a link 214 the lower end of which is shown forked to straddle shaft 100, (Figs. 2$^a$ and 29). Link 214 is provided with a pin 215 co-operative with a cam 216 on shaft 100, whereby the link will be operated to rock rod 212 in proper timing. The carrier block 206 is reciprocated along rods 207, 208 by means of a link 217 pivotally connected to said carrier and to an arm 218 pivoted upon the main frame at 219, (Fig. 29). Arm 218 has a pin 220 co-operative with a cam 221 carried by a stud on shaft 222, shown supported on a leg of the main frame, (Figs. 2$^a$ and 29). Cam 221 has a gear 223 in mesh with a gear 224 on shaft 100 for rotating said cam, (Fig. 29), when arm 218 brings carrier 206 to rest opposite magazine label delivering guide 203 the rod 212 will be in position to permit a label projecting from said guide to be received between gripper 209 and extension 206$^a$, (Fig. 31), and thereupon rod 212 will be rocked to cause the gripper to grasp the label against extension 206$^a$ (Fig. 34). Arm 218 will next move the carrier with the label to present the label over rollers 165, 166 to receive a package B thereon, (Fig. 2$^a$), and rod 212 will be rocked to cause gripper 209 to release the label. Said operations occur each time carrier 206 is moved in opposite directions to supply labels successively for the successive packages.

When a package B has been deposited on a label by grippers 151 of arms 149, and the latter have moved away, the roll 173 is caused to descend upon said package to roll the label upon the wrapper. The arm 174 is shown pivotally connected with a link or rod 225 that is pivotally connected with bell crank 226 pivotally supported by bracket 227 on the main frame, said bell crank being shown pivotally connected by link 228 with bell crank 109$^b$, (Fig. 2). By the means described both arms 109 and 174 will be raised and lowered together in timed relation to the rocking of arms 55, 139 and 149. When arm 174 is elevated the pasting roller 180 will engage and receive adhesive material from a distributing roller 229 journalled upon a tank 230, supported on cross bar $b$ and containing adhesive, (Figs. 1$^a$, 2$^a$ and 29). Roller 229 engages a roller 231 journalled in said tank to receive and distribute adhesive to roller 229. Shaft 232 has a gear 233 in mesh with a gear 234 on the shaft of roller 229 for rotating the latter. Shaft 232 has a sprocket wheel 235 receiving a chain 236 from a sprocket 237 on stub shaft 237$^a$ for driving the rollers 231, 229 to apply adhesive to roller 180 when the latter is elevated in contact with roller 229. Shaft 237$^a$ carries pulley 237$^b$ driven by belt 237$^c$ from pulley 237$^d$ on shaft 100, (Fig. 29). When arm 174 descends with rollers 173 and 180 the latter will engage the label C and apply adhesive thereto as it is wound around the package B by the engagement of roller 173 with the package resting on rollers 165, 166 a portion of the label being between roller 180 and extension 206$^a$, (Fig. 16). The pasted part of the label adheres to its portion first applied around the wrapper. At 238 are fingers carried by slides 239 guided to reciprocate in slots 240 in supports 54, (Figs. 13 and 29), which fingers are adapted to bear against the ends of packages B to finally tuck or iron the folded inner ends of the wrappers. The slides 239 are pivotally connected with links 241 that are pivotally connected with rods 130. The fingers 238 are substantially similar to fingers 125 and are operated therewith, so that while fingers 125 fold in the projecting end portions of the wrappers as they are rolled around the articles A for one package the fingers 238 will correspondingly operate against the previously folded in end portions of the wrapper of another package.

The operation may be described as follows:—

The hopper being supplied with articles A in bulk, the strip 76 being adjusted in position, the magazine being supplied with labels C and the machine started, the articles A freed from broken pieces, loose particles and the like are assembled in series in the spaces between bars 4, plate 36 will be reciprocated to raise each series of articles A in guideway 29, the arms 55, 139 and 149 with their respective grippers will be rocked together, and the label carrier 206 will be reciprocated, all of the parts operating in timed relation. Each time a series of articles A is raised to the upper part of guideway 29 the grippers 73 will grasp such articles and deposit them upon a wrapper, the strip 76 being fed and the knife 95 being operated in proper time to supply the wrapper upon rollers 92, 93 before the grippers 73 deposit the articles A on the wrapper. When the grippers release the articles on the wrapper the arms 109 and 174 are lowered, roll 107 being operated to wind the wrapper around the articles A, the roll 173 being operated to roll label C around a package. When arms 55 swing toward guideway 29 to receive the assembled series of articles A the arms 139 swing toward the wrapped articles on rollers 92, 93, and the arms 149 swing toward rest 138. When said arms move reversely the grippers of arms 149 remove the wrapped articles or package from rest 138 and deposit the same upon a label on rollers 165, 166 the grippers of arms 139 grip the wrapped articles or package on rollers 92, 93 and deposit the same on rest 138 and the grippers of arms 55 carry a new series of articles A for deposit upon wrapper B on rollers 92, 93. The three aforesaid operations occur simultaneously and in a successive manner, so that different operations are being carried out simultaneously regarding different packages being produced, so that with each to and fro swing of arms 55, 139 and 149 a rolled and labeled package is discharged. When arms 149 swing away from rollers 165, 166 the label carrier 206 will be operated to present a label over said rollers, and each time that arm 109 is lowered to present roll 107 against the articles A to roll wrapper B thereon the arm 174 will be lowered to cause paster roll 180 to apply paste on a label and to cause roll 173 to roll a pasted label on the wrapped package of articles.

An advantage of the present invention is that the wrappers are rolled on the articles and the labels are rolled on the wrapped articles or packages for production of packages of tightly and snugly assembled articles in an accurate, expeditious and economical manner, free from broken pieces and waste.

The invention is not limited to the particular details of construction and relative arrangement of parts, as the same may be varied or modified within the scope of the appended claims without departing from the spirit of our invention.

Having thus described our invention, what we claim and desire to secure by Letters Patent is:—

1. The combination of a pair of rollers, one of said rollers having a groove, means to apply wrappers upon the rollers, devices to assemble articles on the wrappers on the rollers and operative in the aforesaid groove, a guide movably supported between said rollers to guide the wrappers thereon, means to actuate the guide, a roll to co-operate with said articles and wrappers to roll them together, means to move the roll toward and from said rollers, and means to operate said roll.

2. The combination of a pair of rollers, means to apply wrappers upon the rollers, devices to assemble articles on the wrappers on the rollers, said rollers having opposing grooves, a guide between the rollers operative in said opposing grooves, spring means normally elevating said guide in position to guide wrappers, a roll to co-operate with said articles and wrappers to enclose the latter around the articles, means to move said roll toward and from the articles on the rollers, and means to rotate said roll.

3. The combination of a pair of rollers, means to apply wrappers upon the rollers, devices to assemble articles on the wrappers on the rollers, one of said rollers having grooves, a roll co-operative with the articles and wrappers on said rollers to enclose the articles in the wrappers, fingers adjacent to said roll to enter grooves of one of said rollers to guide the wrappers around the articles, means to move said roll and fingers toward and from said rollers, and means to rotate said roll.

4. The combination of a pair of rollers, means to apply wrappers upon the rollers, devices to assemble articles on the wrappers on the rollers, one of said rollers having grooves, a roll cooperative with the articles and wrappers on said rollers to enclose the articles in the wrappers, wrapper guiding means between the rollers operative in said grooves, fingers adjacent to said roll to enter grooves of said grooved roller to guide the wrappers around the articles, means to move said roll toward and from said rollers, and means to rotate said roll.

5. The combination of a pair of rollers, means to apply wrappers upon the rollers, devices to assemble articles on the wrappers on the rollers, one of said rollers having grooves, a roll cooperative with the articles and wrappers on said rollers to enclose the articles in the wrappers, wrapper guiding means between the rollers operative in said grooves, fingers adjacent to said roll to enter grooves of said grooved roller to guide the wrappers around the articles, a guard spaced from said fingers to retain packages being wrapped between the roll and rollers, means to move said roll and guard toward and from said rollers, and means to rotate said roll.

6. The combination of a pair of rollers, means to apply wrappers upon the rollers, devices to assemble articles on the wrappers on the rollers, one of said rollers having grooves, a roll cooperative with the articles and wrappers on said rollers to enclose the articles in the wrappers, fingers adjacent to said roll to enter grooves of said grooved roller to guide the wrappers around the articles, a guard spaced from said fingers to retain packages being wrapped between the roll and rollers, means to move said roll toward and from said rollers, and means to rotate said roll.

Signed at New York, county of New York and State of New York, this 17 day of February, 1920.

ERNEST D. ANDERSON.
CARL BECKMANN.